(12) United States Patent
Scheid et al.

(10) Patent No.: US 8,240,520 B2
(45) Date of Patent: Aug. 14, 2012

(54) MATERIAL EXTRUDER

(75) Inventors: James Eric Scheid, Bloomington, IN (US); Larry Boivin, Fayetteville, NC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 969 days.

(21) Appl. No.: 12/061,228

(22) Filed: Apr. 2, 2008

(65) Prior Publication Data

US 2011/0031266 A1 Feb. 10, 2011

(51) Int. Cl.
*F42B 3/00* (2006.01)
(52) U.S. Cl. ........... 222/389; 222/1; 222/61; 222/340; 222/396; 222/397; 86/20.15; 29/428
(58) Field of Classification Search .......... 222/1, 61, 222/325–327, 340, 386, 389, 391, 394, 396, 222/397, 399; 86/20.15; 184/39; 292/256.6; 29/428
See application file for complete search history.

(56) References Cited

U.S. PATENT DOCUMENTS

| | | | |
|---|---|---|---|
| 2,446,501 A | 8/1948 | Weber | |
| 3,136,456 A | 6/1964 | Sherbondy | |
| 3,774,496 A * | 11/1973 | Roach | 86/20.15 |
| 4,098,189 A * | 7/1978 | Holm | 102/322 |
| 4,116,364 A * | 9/1978 | Culbertson et al. | 222/40 |
| 4,376,498 A | 3/1983 | Davis, Jr. | |
| 4,776,458 A * | 10/1988 | Summons et al. | 222/386 |
| 6,026,985 A | 2/2000 | Elliott, Sr. | |
| 6,223,952 B1 * | 5/2001 | Woodford | 222/157 |
| 6,581,805 B2 | 6/2003 | Conboy et al. | |
| 6,610,042 B2 * | 8/2003 | Leon et al. | 604/500 |
| 7,261,220 B2 | 8/2007 | Campbell et al. | |
| 2009/0065532 A1 * | 3/2009 | Lafond | 222/389 |
| 2010/0327011 A1 * | 12/2010 | Rancourt | 222/1 |

OTHER PUBLICATIONS

Albion Corp, Air Powered Isolated Air Cylinder Models, Catalog 261c, 2008, 2pgs, Albion Corp, Moorestown, NJ, http://www.albioneng.com/cat/7.pdf.
Albion Corp, Air Powered Standard Drive, Catalog 260c, 2008, 2pgs, Albion Corp, Moorestown, NJ, http://www.albioneng.com/cat/14.pdf.
Intellispense, Pneumatic Gun, 2008, 2pgs, Intellispense Corp, Agoura Hills, CA, http://www.dispensingsolutions.com/air_cartridge_gun.htm.
Cooper Hand Tools, Caulkmaster Dispending Product, 2008, 1 pg, http://www.cooperhandtools.com/brands/caulkmaster/index.cfm.

* cited by examiner

*Primary Examiner* — J. Casimer Jacyna
(74) *Attorney, Agent, or Firm* — Christopher A. Monsey (57) ABSTRACT

A method and apparatus for extruding viscous materials is provided. A dispenser comprises a control mechanism(s), a material containing structure and ports adapted to be coupled to a portable high-pressure gas source. A user controls a flow of the high-pressure gas with a control mechanism such as a trigger. The gas moves a piston inside the material containing structure and displaces viscous materials, such as an explosive, out of the structure through an output port or an output port coupled to a nozzle. A transparent materials tube may be provided to facilitate visual monitoring of the material flow. Localized and system wide pressure is controlled by structural design, material application on a structural component or control mechanisms to mitigate or eliminate a possibility of unintended effects from extrusion of the material including explosion due to overly high pressures between components of the extruder system.

31 Claims, 6 Drawing Sheets

MATERIAL EXTRUDER

STATEMENT REGARDING FEDERALLY SPONSORED RESEARCH OR DEVELOPMENT

The invention described herein was made in the performance of official duties by an employee of the Department of the Navy and may be manufactured, used, licensed by or for the United States Government for any governmental purpose without payment of any royalties thereon.

FIELD OF THE INVENTION

The invention relates to material dispensing and to a method and apparatus for large volume extrusion of viscous materials and especially viscous explosive material.

BACKGROUND OF THE INVENTION

Explosives play a large role in many drilling, excavating, mining, oilfields and demolition operations. However, such activities often take place far from any developed infrastructure of roads or power utilities. In remote areas there is usually very limited infrastructure to support such activities. Nevertheless, in such situations it is necessary to transport and apply the necessary explosives where needed quickly and with unimpeded mobility.

A wide variety of explosive materials are available in bulk form on the commercial and military markets, and these come in all forms including liquids, gels, slurries, granulated particulate, crystalline powder and cast or pressed solids. One method of employing explosives is to bore a hole or series of holes in the object or material to be moved or destroyed and insert the explosive into the hole. The explosive can then be detonated to achieve the objective. Where multiple boreholes are used the timing and power of the explosive charges can be carefully manipulated to control the shape, area and result of the applied force. This is often done in surface mining operations to remove rock overburden and in structural demolition to control the rate and direction of the fall of the structure.

In one example, liquid and slurry explosives, or granulated products are among the easiest to insert into a borehole, and are effective as long as the borehole is drilled down into non porous or fractured rock. Unfortunately, where holes are drilled horizontally or vertically up and/or into porous and fractured surfaces they cannot contain the explosive and control of the charge is difficult. Solid explosives, often in stick or shaped form, may be inserted into boreholes in most any direction or material, but are difficult to insert deeply or into irregularly shaped openings.

Existing systems require considerable equipment and machinery and are imprecise in terms of the quantity of explosive material inserted into the hole. What is needed is a more portable, lightweight and safe material dispenser adapted to manipulate or extrude materials including explosive material.

SUMMARY OF THE INVENTION

The present invention provides a portable lightweight, safe, user reloadable and reliable means for extruding or dispensing viscous materials into boreholes or any other location. Embodiments of the invention allow visual observation and control of the application rate and/or volume. One embodiment of the invention generally comprises a trigger valve, supportive chassis, a material tube or enclosure and a portable high-pressure air source (e.g., a SCUBA tank for example). A user controls the flow of the high-pressure air with the trigger and adjustable regulator and relief valves. The air moves a piston inside a material tube and forces explosive material out of the tube/enclosure, through a nozzle and into the borehole or other location desired.

The dispenser according to one embodiment of the present invention incorporates a transparent polymer (acrylic) material tube that allows a user to see the movement of the material and to start and stop the flow as required. Movement of the material and internal piston is clearly visible through the wall of the transparent Users can use a reference table/aid to associate piston travel, temperature of material to be extruded and material properties with displacement volume and/or travel required to effect a specific explosive result

DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiment illustrated in the drawings, which is described below. The embodiment disclosed below is not intended to be exhaustive or limit the invention to the precise form disclosed in the following detailed description. Rather, the embodiment is chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

The invention is a method and apparatus for dispensing of viscous materials. One embodiment of a dispenser according to the present invention incorporates a transparent polymer (e.g., acrylic) tube that allows a user to see the movement of the material and to start and stop the flow as required. This results in more accurate and more rapid dispensing of material. An embodiment of the invention is adapted for large volume extrusion of explosives designed to operate at the high pressures necessary to extrude high viscosity explosive materials to a sufficient depth in an internal area of a structure or area to be subjected to demolition.

Figure 1:
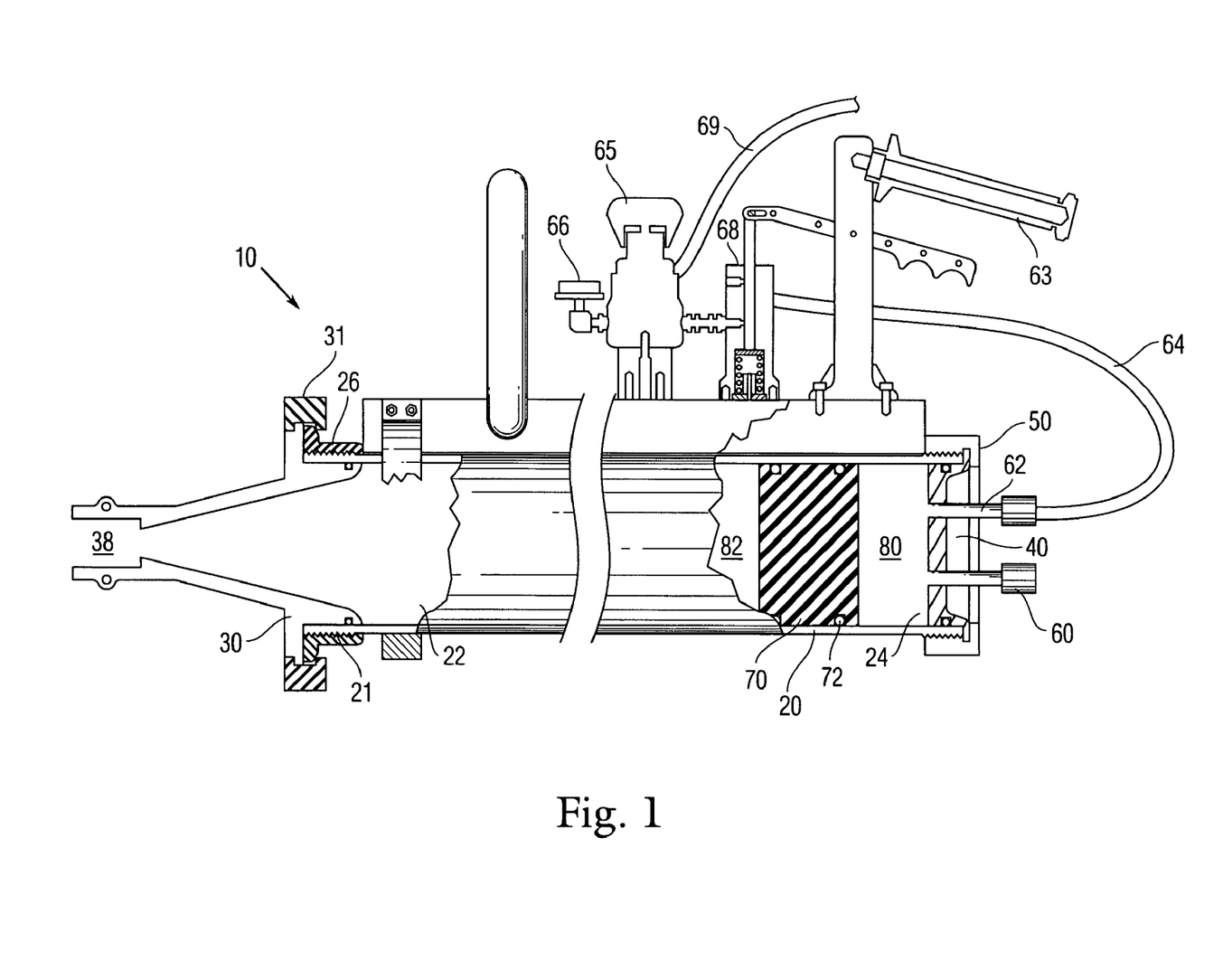
FIG. 1 is a side view of a dispenser with a material tube and end cap partially cut away.

FIG. 1 shows a partial cutaway section view of a dispenser system 10 with a transparent tube 20 according to one embodiment of the present invention. Tube 20 has, in this embodiment, an outside diameter of approximately 5 inches and a length of approximately 22 inches, and is formed from a transparent polymer. Clear polymethyl methacrylate (PMMA or acrylic) can be used for manufacture of the tube 20 owing to its strength and weight properties as well as its transparency and relative economy of cost and availability. Other compounds such as clear polystyrene or polycarbonate plastics are similarly suitable but generally come at a higher cost. Transparent monomers and other materials having the necessary characteristics, notably transparency, may also be suitable.

Tube 20 can be formed or machined with threads 21 along its outside surface at outlet end 22, and as well at inlet end 24 for attachment of fittings. Specifically, in this embodiment, an aluminum collar adapter 26 having internal threads 28 (See FIG. 2A) is threaded over the outside of tube 20 to facilitate attachment of an extrusion nozzle at outlet end 22.

Figure 2A:
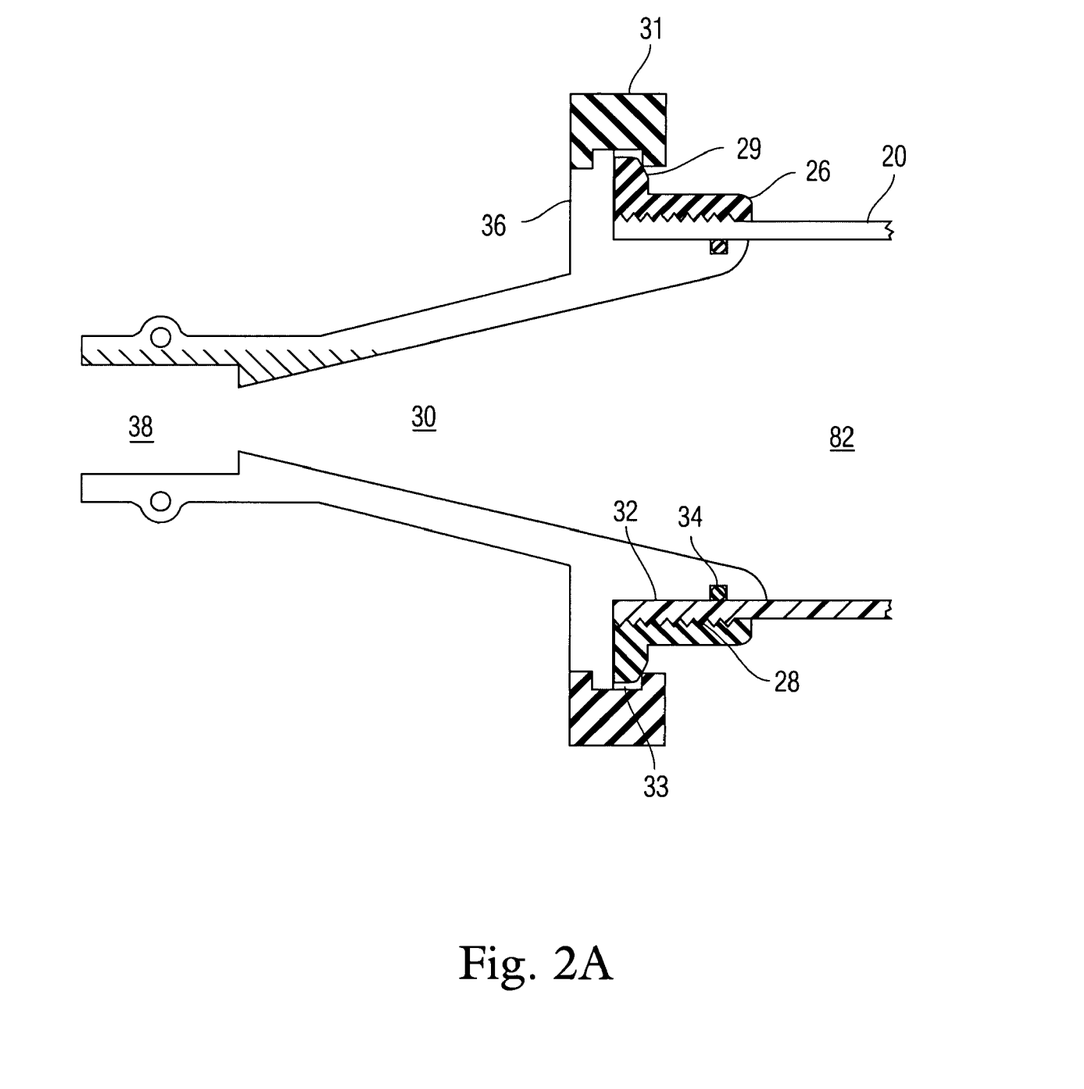
FIG. 2A is detailed partial section of a nozzle cone/tube connection.

FIG. 2A shows a detailed partial section of a nozzle cone/tube connection in accordance with an exemplary embodiment of the invention. The extrusion nozzle comprises a nozzle cone 30 having a flange 36 delimiting an annular tube seat 32 for press-fit insertion through the collar adapter 26 and into the outlet end of the material extrusion tube 20. The tapered mating flange 29 of collar adapter 26 contacts the corresponding tapered flange 36 of the nozzle cone 30 indicating the nozzle cone/tube are fully seated. The annular tube seat 32 is defined by an annular groove 34 for seating an O-ring which may be used to seal the connection of nozzle cone tube seat 32 and tube 20. A hinged circular clamp 31 is defined by a flange-receiving groove 33 circumscribed about its inner surface, and clamp 31 is fitted over the adjoined tapered flanges 29, 36 of the nozzle cone 30 and collar adapter 26, and is tightened thereby compressing the tapered flanges and securing nozzle cone 30 to the outlet end of the material extrusion tube 20. Circular clamp 31 is necessary to secure nozzle cone 30 at system operating pressures within a normal range of from 100-250 psi, and is preferably strength-rated to withstand a maximum operating pressure that exceeds the strength rating of the tube 20 itself, for example, approximately 750 psi.

Nozzle cone 30 is formed to taper down from the tube 20 diameter to, in the present embodiment, an extrusion aperture 38 of approximately 1 inch in diameter over the approximately 6 inches length of the cone. The diameter of the extrusion aperture 38 and length of the nozzle 30 may be varied in relation to the bore hole size and explosive material viscosity. This embodiment of the present invention is adapted to dispense material having a viscosity up to 2,000,000 centipoise. Nozzle cone 30 is ideally constructed of machined aluminum although other materials having similar strength, weight and machine-ability characteristics may be alternately used. One skilled in the art should understand that an extension tube 51 (e.g., see FIG. 2B), preferably of up to four feet in length, may be mated with the nozzle outlet to provide additional control over explosives or material placement. Tube 51 ensures that explosive materials is situated as desired within a structure subjected to demolition prior to detonation rather than in a less effective external or surface placement position.

Figure 3A:
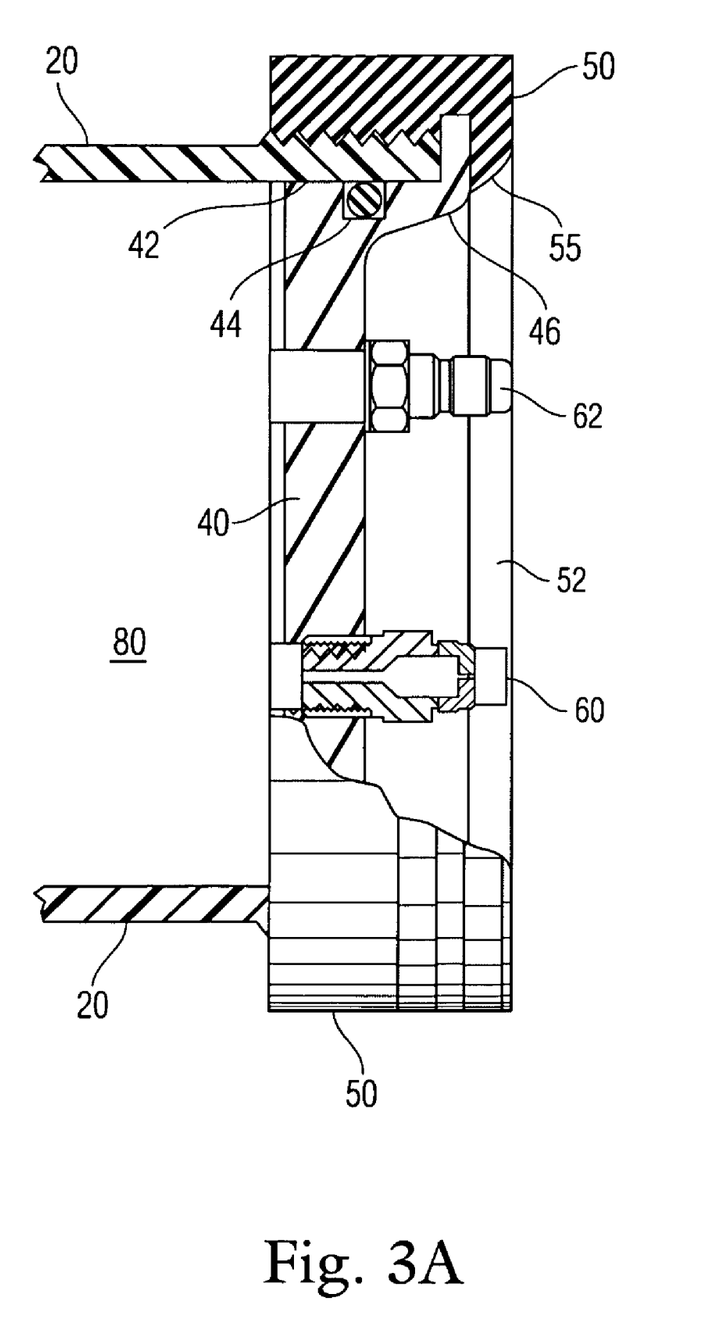
FIG. 3A is detailed partial cutaway section of an end cap/tube connection.

FIG. 3A shows a detailed partial cutaway section of the end cap/tube connection at the inlet end of the material extrusion tube 20 in accordance with an exemplary embodiment of the invention. A flanged end cap 40 having tube seat 42 and annular groove 44 is inserted into the tube 20 until the tube contacts flange 46 indicating the tube is fully seated. An O-ring at groove 44 may be used to seal the connection between end cap tube seat 42 and tube 20. Retaining ring 50 having valve aperture 52 (See FIG. 3C) is inserted over end cap 40 such that the threads on the interior of the retaining ring engage the threads on the outside of the inlet end of the material extrusion tube 20. Tightening the threaded connection between the tube 20 and the retaining ring 50 draws the flange 55 of ring 50 up against end cap 40 thereby sealing it in tube 20. Retaining ring 50 is necessary to secure end cap 40 at system operating pressures and is preferably rated to at least 750 psi.

Figure 3B:
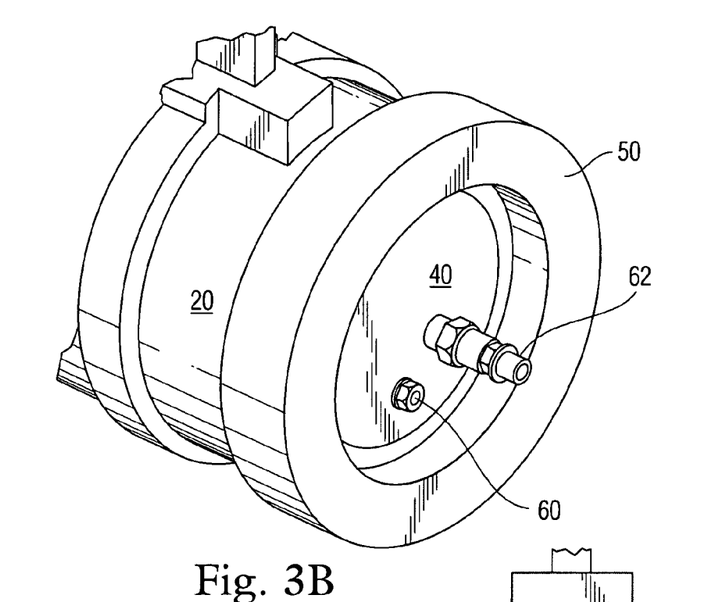
FIG. 3B is a partial perspective view of an end cap/tube connection.
Figure 3C:
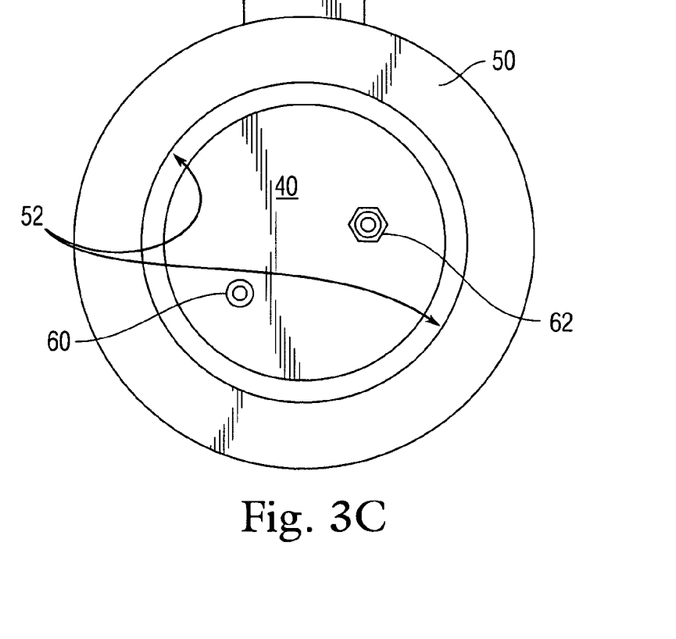
FIG. 3C is a rear elevation view of the end cap.
Figure 4:
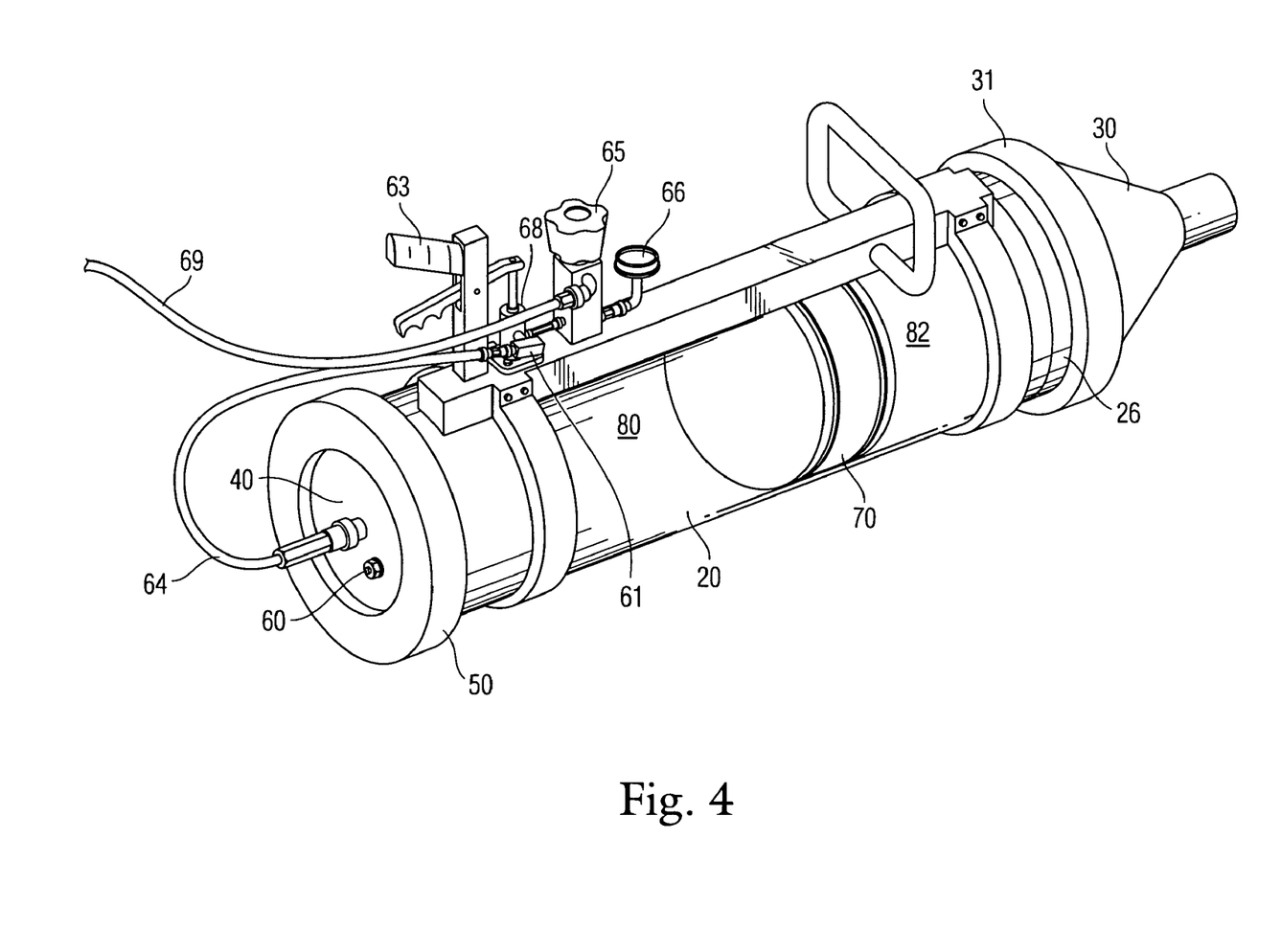
FIG. 4 is a perspective view of an embodiment of the dispenser.

Two threaded tapered holes are provided at the back plate of end cap 40. As seen in FIGS. 3A through 3C, an adjustable pressure relief valve 60 may be installed in the back plate to control and release excess gas pressure in the extrusion tube. Various adjustable pressure relief valves for manual and automatic release can be used. An air filler port 62 can be installed at another hole in the back plate. Filler valve 68 is connected to filler port 62 and may be rigidly affixed to end cap 40 or may be fixed elsewhere and connected to filler port 62 via flexible tubing 64, as depicted in FIG. 4. Filler valve 68 may be operated by pistol grip actuator 63. Filler valve 68 is connected to a high pressure gas source (a SCUBA tank, for example, or a mechanical compressor) by flexible tube 69 via regulator valve 65. Regulator valve 65 may be adjusted to control the maximum pressure admittable into tube 20 by valve 68 in the full open position. The fluid or gas source, in one embodiment, is preferably a portable high pressure gas source and more preferably a portable highly pressurized air source, although alternate embodiments of the present invention may employ any pressurized gas or liquid. Filler valve 68 controls the operational flow of gas into tube 20 from the source. Overall flow of gas may be controlled by regulator valve 65 and monitored by gauge 66.

Returning to FIG. 1, before the inlet end of tube 20 is sealed by end cap 40 as described above, piston 70 is inserted into the tube 20. Piston 70 in this exemplary embodiment is cylindrical in form and slightly smaller in diameter than the inside diameter of tube 20 so as to be in sealed yet slideable engagement with an interior surface of tube 20. Piston 70 can further be formed with annular grooves 72 at each end for seating O-rings that improve the quality of the sealed engagement between piston 70 and tube 20. It should be understood that the quality of the sealing engagement between piston 70 and tube 20 will vary depending on a series of design parameters including, but not limited to, the allowable or desired explosive residue level on the interior surface of the tube, the degradation parameter for cylinder reuse, the explosive detonation characteristics, the operating environment temperature range, and the type of piston used and material from which it is constructed. Piston 70 is preferably fabricated from acetal polyoxymethylene (available from Dupont™ under the trade name Delrin® as well as from other suppliers), although other materials may be chosen based on their strength, weight and friction characteristics. The insertion of piston 70 into tube 20 divides the tube into two areas, a gas expansion area 80 behind the cylinder and between the end cap 40 and a material area 82 in front of the piston 70 and between the nozzle cone 30.

One embodiment of the invention can be produced by the following steps: piston or member 70 is inserted into a tube so as to be closer to the inlet end 24 such that a gas expansion area is small, approaching zero volume, and a material area is consequently large in relation. A material area in the tube is filled with a viscous explosive material and a nozzle cone is secured to seal an outlet end 22 save for an extrusion aperture 38 through which the material will be extruded during operation. A preferably portable high pressure gas source is connected to regulator valve 65 and the unit is deployed to any location explosives are necessary.

Figure 2B:
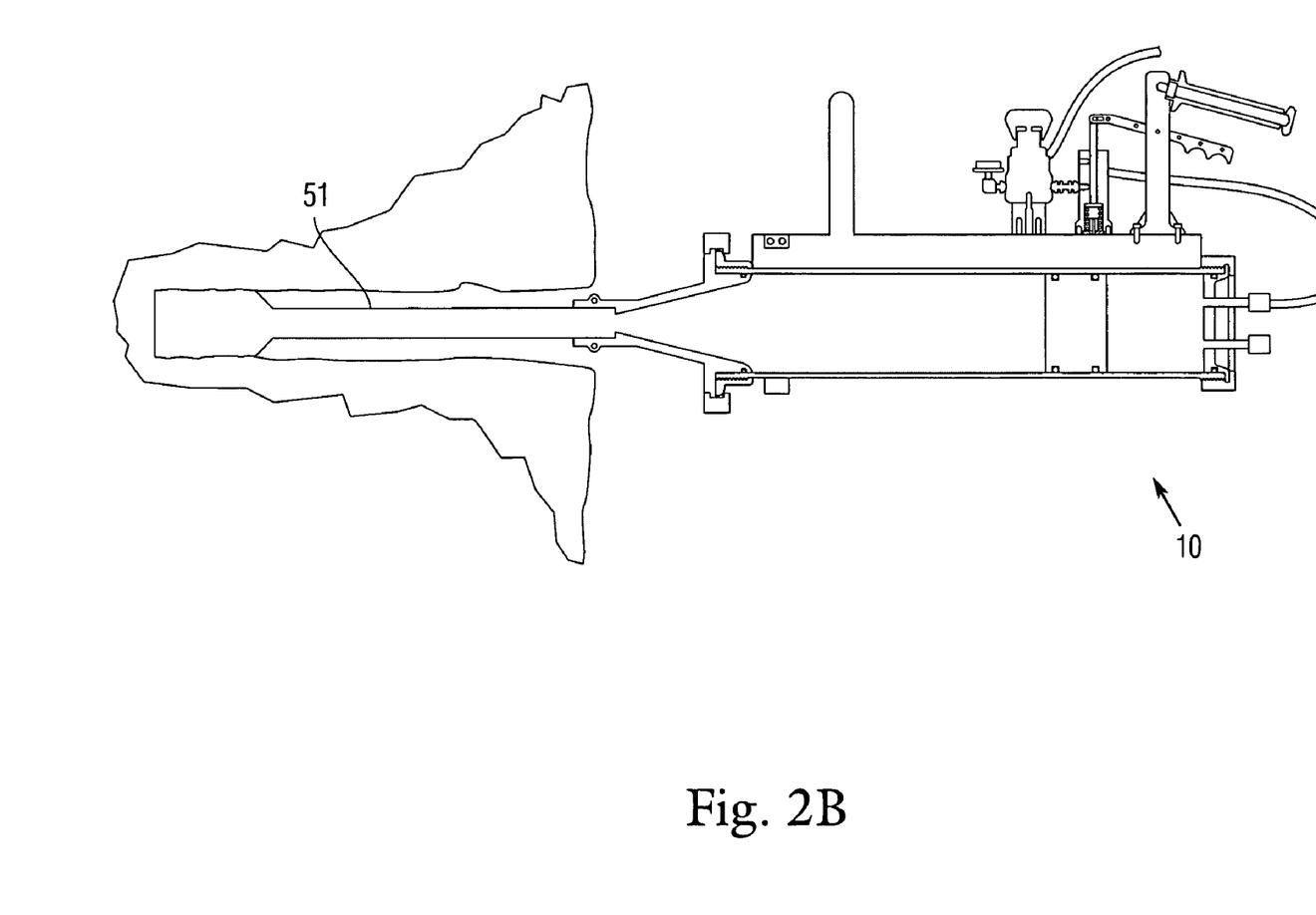
FIG. 2B is a schematic view of a dispenser in operation with a nozzle extension tube

In an exemplary operation, as depicted in the embodiment of FIG. 2B, after identification of a hole or recessed area where explosive material is needed, a nozzle tube extension 51 is inserted into hole or access area until it reaches a desired depth or position. A filler valve or control 68 is then opened allowing compressed gas to flow into gas expansion area 80. Pressure in the gas expansion area quickly increases such that the piston 70 is displaced laterally in the tube. Lateral displacement of the piston enlarges the gas expansion area 80 and consequently shrinks the material area 82 forcing some of the viscous explosive material to be extruded into the bore hole. Depending on the viscosity of the explosive material (which is itself dependent on factors including ambient temperature), operating pressure of this embodiment is between 100 and 250 psi.

Extrusion of explosive material will continue in this embodiment as long as an operator maintains the filler valve 68 in the open position allowing pressurized gas to flow into the gas expansion area. As the volume of the gas expansion area is increased by the lateral displacement of the piston additional compressed gas is necessary to maintain the operating pressure. Extrusion will cease or reduce in flow upon closing the air filler valve control. Lateral displacement of a piston is clearly visible to an operator through the clear walls of the acrylic material tube so as to allow the operator to monitor the rate and volume of explosive material extruded. An operator can stop or reduce gas flow at any time by releasing or manipulating the filler valve, and can resume extrusion as desired. Tube 20 may be calibrated with markings along its longitudinal axis indicating the distance that piston 70 has been displaced. A table based on the volume of tube 20 may be provided to correlate piston travel, material properties, material temperature or other factors with a volume of material extruded. In this exemplary embodiment, an additional manually actuated bleed valve 61 (e.g., FIG. 4) is provided to depressurize the system when the operation is complete for disassembly and/or reloading. Field reloading, in one embodiment, is accomplished by removing nozzle cone 30, returning piston 70 to its original position, placing additional material to be dispensed in area 82, and replacing the nozzle cone.

In addition to buildup and sudden discharge of pressure, the design of one exemplary embodiment of the present invention serves to eliminate the potential for pinch points to develop at metal on metal contact points within the device. Such pinch points potentially trap explosives developing localized high pressure zones that can cause detonation of the material. The long taper of the nozzle cone, the relieved corners of the non-metal piston assembly and the use of pliable gasketing or O-rings all serve to reduce the pinch risk and hence the risk of unintended detonation. For example, care can be taken to ensure that no element of a material enclosure or structure with explosive in contact thereof presents an orthogonal surface which may come into contact with a piston so as to avoid pinching of explosive material between said surface and the piston during operation. An example of avoiding pinch spots can include ensuring the piston face and an interior portion of the nozzle facing the piston face do not exert sufficient pressure on an explosive material between them so as to present an explosives safety hazard. Other design features such as coating all or part of an interior of a structure(s) in contact with explosives with silicon or other friction reducing coating can also be used to increase safety and operation of an apparatus in accordance with the invention. Other features can be included including temperature controls for controlling a temperature of explosives within a structure or part thereof can also be used to ensure viscosity of materials to be extruded is within a range desired for use with an embodiment in accordance with the invention.

It should be understood that the invention may be used with a variety of materials and used beyond lightweight and portable explosive dispensers including feeding baby whales Consequently, while this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A dispenser for extruding a viscous material, comprising:
    a housing having a longitudinal axis, a body with a wall, and defining an enclosure for containing a quantity of a viscous material, said housing having an outlet opening on a first end of said housing and an inlet opening in communication with said enclosure on a second end of said housing, said housing further constructed of transparent material;
    a partition in slidable and sealed engagement with an interior surface of said enclosure along said longitudinal axis, said partition variably defining a first and second area within said enclosure wherein said first area is adapted to receive said viscous material between a first side of said partition and said outlet opening and said second area is variably defined between a second side of said partition and said inlet opening, wherein said partition is formed from a non-metallic material and is further formed with relieved corners or edges;
    a nozzle section formed with a tapered interior outlet cavity, said nozzle section comprises a first nozzle end section and an opposing second nozzle end section, said first nozzle end section is formed with a first and second nozzle flange which are formed substantially perpendicular to each other, said first nozzle flange comprises an insertion flange section which is adapted to coaxially insert into and sealingly engage into said outlet opening on said first end of said housing, wherein said insertion flange section delimits a seat section of said housing and is adapted for a press fit insertion into said outlet opening, wherein said insertion flange has an outer end oriented towards said partition which is formed to reduce a localized area of high pressure within said viscous material due to compression of said material between said insertion flange's surface and the advancing partition as the partition is advanced to the fully displaced position;
    a collar adapter coaxially coupled with said housing on said first end, wherein said collar adapter is formed with a collar adapter flange along an outer collar adapter surface extending and oriented away from said longitudinal axis, said collar adapter further having internal threads on an inner surface oriented towards said longitudinal axis, wherein an outer section of said housing in proximity to said first end of said housing is threaded to facilitate threaded engagement of said collar adapter internal threads;

a hinged circular clamp formed with a flange-receiving groove circumscribed about its inner surface, said clamp is fitted over adjoining said collar adapter flange and said second nozzle section flange and is tightened thereby compressing said collar adapter flange and said second nozzle section flange so as to secure said nozzle section to said first end of said housing, wherein said hinged circular clamp is adapted to secure said nozzle section at an operating pressures of at least 100-250 psi, and is formed to be strength-rated to withstand a maximum operating pressure that exceeds the strength rating of said housing itself of at least 750 pounds per square inch; and a first and second control mechanisms in selectable communication between a pressurized fluid source and said second area;

wherein said enclosure is formed with distance reference markings along said longitudinal axis adapted to indicate a distance said partition has been displaced along said longitudinal axis;

whereby said control mechanisms are adapted to selectively admit pressurized fluid into said second area to displace said partition along said longitudinal axis toward said outlet opening, thereby forcing said viscous material to be extruded from said first area though said outlet opening;

wherein said first control mechanism is a proportional flow control valve;

wherein said longitudinal axis is defined by a movement of travel of said partition within said housing and a lateral axis is defined by a line that is substantially orthogonal to said longitudinal axis, wherein said housing is formed with said transparent material to permit viewing of said partition through said housing's wall that is in said slidable and sealed engagement with said partition, said transparent material section of said housing comprises a section which is defined as at least forty percent of said housing's body with a center section substantially at a mid point between opposing ends of said housing and permitting viewing through a plane of 360 degrees of said lateral axis through a portion of said movement of travel of said partition;

wherein said housing's interior surface and a side of said partition facing said first area are formed to prevent a pinch point or a localized high pressure zone between said side of said partition and sections of said housing's interior surfaces which prevent lateral movement of said partition toward said opening in said housing;

wherein said second control mechanism is a pressure relief valve whereby the maximum pressure in said enclosure is limited.

2. The dispenser of claim 1 further comprising a third control mechanism adapted to further control said fluid in communication with said second area.

3. The dispenser of claim 2 wherein said third control mechanism is a pressure regulator valve whereby the maximum pressure of fluid input into said second area by operation of said proportional flow valve is selectively controlled.

4. The dispenser of claim 1 wherein said enclosure is a cylinder.

5. The dispenser of claim 1 wherein said partition is a piston or disk.

6. The dispenser of claim 5 wherein said piston or disk is comprised of a cylinder and at least one O-ring.

7. The dispenser of claim 5 wherein said piston or disk is constructed of electrically nonconductive material.

8. The dispenser of claim 5 wherein said piston or disk is constructed of material selected to reduce friction between said piston and said enclosure.

9. The dispenser of claim 1 wherein said enclosure is adapted to dispense material at between 100 pounds per square inch and 250 pounds per square inch of pressure.

10. The dispenser of claim 1 wherein said enclosure is adapted to extrude viscous material having a viscosity of 13,000 centipoise to 2,000,000 centipoise.

11. A dispenser as in claim 1, further comprising a high pressure fluid source adapted to provide said pressurized fluid.

12. A dispenser as in claim 11, wherein said high pressure fluid source is a high pressure vessel tank.

13. A dispenser as in claim 1, further comprising a coating of all or part of an interior section of said housing with a friction reducing coating adapted to reduce friction between said housing and said viscous material.

14. A dispenser as in claim 1, further comprising a support structure and a first and second coupling structure, said first coupling structure couples said support structure in proximity to said first end of said housing, said second coupling structure couples said support structure in proximity to said second end of said housing.

15. A dispenser as in claim 14, wherein said first and second control mechanisms are mounted to said support structure.

16. A dispenser as in claim 1, further comprising a pressure gauge coupled in communication with said first control mechanism, said pressure gauge coupled to said support structure.

17. A dispenser as in claim 1, further comprising a handle structure coupled to said support structure adapted to permit human manipulation of said dispenser.

18. A method of manufacturing a dispenser for extruding a viscous material, comprising:

providing a housing having a longitudinal axis, a body with a wall, and defining an enclosure for containing a quantity of a viscous material, said housing having an outlet opening on a first end of said housing and an inlet opening in communication with said enclosure on a second end of said housing, said housing further constructed of transparent material;

providing a partition in slidable and sealed engagement with an interior surface of said enclosure along said longitudinal axis, said partition variably defining a first and second area within said enclosure wherein said first area is adapted to receive said viscous material between a first side of said partition and said outlet opening and said second area is variably defined between a second side of said partition and said inlet opening, wherein said partition is formed from a non-metallic material and is further formed with relieved corners or edges;

providing a nozzle section formed with a tapered interior outlet cavity, said nozzle section comprises a first nozzle end section and an opposing second nozzle end section, said first nozzle end section is formed with a first and second nozzle flange which are formed substantially perpendicular to each other, said first nozzle flange comprises an insertion flange section which is adapted to coaxially insert into and sealingly engage into said outlet opening on said first end of said housing, wherein said insertion flange section delimits a seat section of said housing and is adapted for a press fit insertion into said outlet opening, wherein said insertion flange has an outer end oriented towards said partition which is formed to reduce a localized area of high pressure within said viscous material due to compression of said material between said insertion flange's surface and the advancing partition as the partition is advanced to the fully displaced position;

providing a collar adapter coaxially coupled with said housing on said first end, wherein said collar adapter is formed with a collar adapter flange along an outer collar adapter surface extending and oriented away from said longitudinal axis, said collar adapter further having internal threads on an inner surface oriented towards said longitudinal axis, wherein an outer section of said housing in proximity to said first end of said housing is threaded to facilitate threaded engagement of said collar adapter internal threads;

providing a hinged circular clamp formed with a flange-receiving groove circumscribed about its inner surface, said clamp is fitted over adjoining said collar adapter flange and said second nozzle section flange and is tightened thereby compressing said collar adapter flange and said second nozzle section flange so as to secure said nozzle section to said first end of said housing, wherein said hinged circular clamp is adapted to secure said nozzle section at an operating pressures of at least 100-250 psi, and is formed to be strength-rated to withstand a maximum operating pressure that exceeds the strength rating of said housing itself of at least 750 pounds per square inch; and providing a first and second control mechanisms in selectable communication between a pressurized fluid source and said second area;

wherein said enclosure is formed with distance reference markings along said longitudinal axis adapted to indicate a distance said partition has been displaced along said longitudinal axis;

whereby said control mechanisms are adapted to selectively admit pressurized fluid into said second area to displace said partition along said longitudinal axis toward said outlet opening, thereby forcing said viscous material to be extruded from said first area though said outlet opening;

wherein said first control mechanism is a proportional flow control valve;

wherein said longitudinal axis is defined by a movement of travel of said partition within said housing and a lateral axis is defined by a line that is substantially orthogonal to said longitudinal axis, wherein said housing is formed with said transparent material to permit viewing of said partition through said housing's wall that is in said slidable and sealed engagement with said partition, said transparent material section of said housing comprises a section which is defined as at least forty percent of said housing's body with a center section substantially at a mid point between opposing ends of said housing and permitting viewing through a plane of 360 degrees of said lateral axis through a portion of said movement of travel of said partition;

wherein said housing's interior surface and a side of said partition facing said first area are formed to prevent a pinch point or a localized high pressure zone between said side of said partition and sections of said housing's interior surfaces which prevent lateral movement of said partition toward said opening in said housing;

wherein said second control mechanism is a pressure relief valve whereby the maximum pressure in said enclosure is limited.

19. A method of manufacturing as in claim 18, further comprising providing a third control mechanism adapted to further control said fluid in communication with said second area.

20. A method of manufacturing as in claim 19, wherein said third control mechanism is a pressure regulator valve whereby the maximum pressure of fluid input into said second area by operation of said proportional flow valve is selectively controlled.

21. A method of manufacturing as in claim 18, wherein said enclosure is a cylinder.

22. A method of manufacturing as in claim 18, wherein said partition is a piston or disk.

23. A method of manufacturing as in claim 22, wherein said piston or disk is comprised of a cylinder and at least one O-ring.

24. A method of manufacturing as in claim 22, wherein said piston or disk is constructed of electrically nonconductive material.

25. A method of manufacturing as in claim 23, wherein said piston or disk is constructed of material selected to reduce friction between said piston and said enclosure.

26. A method of manufacturing as in claim 18, wherein said enclosure is adapted to dispense material at between 100 pounds per square inch and 250 pounds per square inch of pressure.

27. A method of manufacturing as in claim 18, wherein said enclosure is adapted to extrude viscous material having a viscosity of 13,000 centipoise to 2,000,000 centipoise.

28. A method of manufacturing as in claim 18, further comprising providing a support structure and a first and second coupling structure, said first coupling structure couples said support structure in proximity to said first end of said housing, said second coupling structure couples said support structure in proximity to said second end of said housing.

29. A method of manufacturing as in claim 18, wherein said first and second control mechanisms are mounted to said support structure.

30. A method of manufacturing as in claim 18, further comprising providing a pressure gauge coupled in communication with said first control mechanism, said pressure gauge coupled to said support structure.

31. A method of manufacturing as in claim 18, further comprising providing a handle structure coupled to said support structure adapted to permit human manipulation of said dispenser.

* * * * *